United States Patent [19]
Webb et al.

[11] Patent Number: 4,671,541
[45] Date of Patent: Jun. 9, 1987

[54] FLEXIBLE PIPE COUPLING

[75] Inventors: Ian R. Webb, Kenton; Neil J. T. Taylor, Northwood; William Taylor, Pinner, all of England

[73] Assignee: Taylor Kerr (Energy Products) Limited, London, England

[21] Appl. No.: 837,432

[22] Filed: Mar. 7, 1986

[30] Foreign Application Priority Data

Sep. 12, 1985 [DE] Fed. Rep. of Germany ....... 3532545

[51] Int. Cl.$^4$ ............................................. F16L 17/00
[52] U.S. Cl. .................................... 285/112; 285/177; 285/373; 285/419
[58] Field of Search ............... 285/112, 177, 373, 369, 285/419, 417

[56] References Cited

U.S. PATENT DOCUMENTS

| 1,683,076 | 9/1928 | Johnson et al. | 285/112 |
| 3,680,894 | 8/1972 | Young | 285/112 |
| 3,877,733 | 4/1975 | Straub | 285/373 X |
| 4,583,770 | 4/1986 | Kreku et al. | 285/177 |

FOREIGN PATENT DOCUMENTS 1010664 11/1965 United Kingdom ................ 285/112

Primary Examiner—Richard J. Scanlan, Jr.
Attorney, Agent, or Firm—Flynn, Thiel, Boutell & Tanis

[57] ABSTRACT

A resilient flexible pipe coupling for interconnecting two pipes of different diameters in a pressure tight manner comprises a tubular metal casing formed with a longitudinal gap and a tensioning screw device for reducing the width of the gap to tighten the coupling around the adjacent ends of the two pipes. A sealing sleeve of resilient flexible material is arranged within the casing. The sleeve has radially inwardly projecting sealing lips formed on both of its free end. The sealing lips have different radial thicknesses so as to compensate for the difference in diameters of the pipes.

11 Claims, 3 Drawing Figures

FLEXIBLE PIPE COUPLING

BACKGROUND OF THE INVENTION

The present invention relates to a resiliently flexible pipe connection, and in particular a flexible pipe coupling for interconnecting two pipes in a pressure-tight manner, of the type consisting of a tubular metal casing formed with a longitudinal gap, a tensioning screw device secured thereto for reducing the width of the longitudinal gap and a sealing sleeve of resiliently flexible material, arranged within the casing and having formed on both free ends thereof sealing lips of predetermined thickness extending radially inwardly with respect to the pipes.

Such mechanical pipe connections of the flexible couplings type are provided for connecting together smooth-ended pipes of any material. Moreover, the couplings can be adjusted in the factory so that they fit over pipes even when the pipes are of the maximum size permitted within their tolerance range. By means of the screw device the metal casing is tightened in the circumferential direction of the pipes. A reliable sealing effect is ensured by the sleeve with its sealing lips. The sleeve adapts itself to changing pressures within the pipe. To a certain extent also differences in the outside diameters of the pipes to be interconnected can be compensated for by the known pipe couplings. Thus, for example, in the case of pipes having a nominal diameter of 50 mm to 350 mm, differences of between 1.5 mm and 4 mm can be compensated for solely by the elasticity of the sealing lips together with the flexibility of the metal casing. In cases where there are larger differences in the outside diameters of the pipes, there is the disadvantage that such a compensation is no longer possible.

In the field of gas and water supply as well as in water discharge apparatus the joining together of existing old conduits with pipes of present day manufacture, which in some cases may be composed of different materials and have a greater or smaller diameter than the existing old pipe, using the resiliently flexible pipe connections described above is not possible in cases where this dimensional different exceeds several mm. A requirement to join tubular conduits of different outside diameter may also arise where the wall thickness of the conduit parts are different due to the conduit parts being designed to operate to different nominal pressures or due to the conduit parts being made of different materials having different strengths and therefore requiring different wall thickness to withstand a given pressure.

Up to the present, the solutions to these problems have involved a high consumption of time and material, using complicated and expensive apparatus. For example, caulked sleeves are used which fit over the larger pipe and are then connected in an expensive operation with the surface of the smaller tube by caulking. Furthermore, reducing flanges are known which are used by welding, gluing or clamping flanges of equal dimensions provided with different connecting pieces to the existing pipes. Finally, the joining together of pipes of different diameters is carried out in accordance with the state of the art with the aid of reducing pieces which provide a gradual transition from the larger pipe to the smaller pipe and the ends of which are secured in an expensive manner to the said pipes.

As regards the known devices and methods for interconnecting pipes of different diameters, the general criticism must therefore be made that they are disadvantageous in that they are expensive in themselves and/or to use.

An object of the invention is, to enable smooth-ended pipes having diameters which differ from each other by more than the allowable tolerance range to be joined together in a simple manner and to enable a resiliently flexible pipe connection to be provided which, because of its construction, is simple to operate, is reliable as regards pressure-tightness and has advantages in connection with handling on the construction site. Altogether, a favourable economic efficiency will thereby be obtained for the user.

SUMMARY OF THE INVENTION

This invention provides a resilient flexible pipe coupling for interconnecting two pipes in a pressure-tight manner, said coupling comprising: a tubular metal casing having a longitudinal gap formed in said casing; a tensioning screw device secured to said casing for reducing the width of said longitudinal gap; a sealing sleeve of resiliently flexible material, said sealing sleeve being positioned within said casing, and sealing lips of predetermined thickness formed on both free ends of said sealing sleeve extending radially-inwardly with respect to the pipes, said sealing lips having different radial thicknesses relative to each other. Advantageously, the difference in radial thickness of the sealing lips is such that differences in the diameters of the pipes to be connected of up to 30 mm or even more can be compensated for. At the same time the flexible characteristics of the coupling are preserved which enable it to compensate for changes in the temperature of the pipes especially dissimilar rates of expansion and contraction caused by temperature change on two different pipe materials joined within the same coupling, and for angular deflections in the joints.

According to a preferred embodiment of the invention, in cases where the nominal pipe diameters are between 50 mm and 350 mm, the inside diameter of one of the sealing lips is more than 4 mm and up to 25 mm or even 30 mm greater than the inside diameter of the other sealing lip. In order to improve the effectiveness of sealing, it is proposed according to a preferred construction of the invention to form each of the sealing lips on its axially inner side with an annular extension of trapezoidal cross-section which is separated from the web of the sealing sleeve by a corresponding groove. The annular extension, in the assembled condition, ensures a surface-to-surface annular seal with a sufficient surface pressure and, when the pressure of the medium being conveyed increases, applies additional pressure against the sealing lips as a result of the correspondingly increased pressure in the grooves within the separate annular extensions.

Altogether, the invention achieves the result that pipes of very widely different outside diameters can be interconnected with substantially lower material and assembly costs.

Further details, features and advantages of the subject of the invention become apparent from the following description of the accompanying drawings, in which a preferred embodiment of a stepped coupling according to the invention is illustrated. In the drawing:

DESCRIPTION OF THE PREFERRED EMBODIMENT

Figure 1:
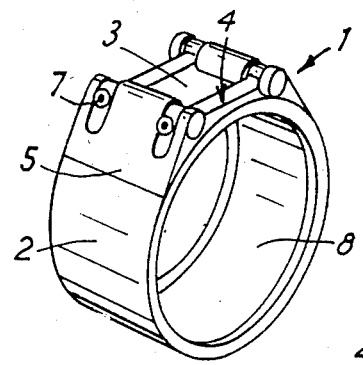
FIG. 1 shows a stepped coupling in perspective.
Figure 2:
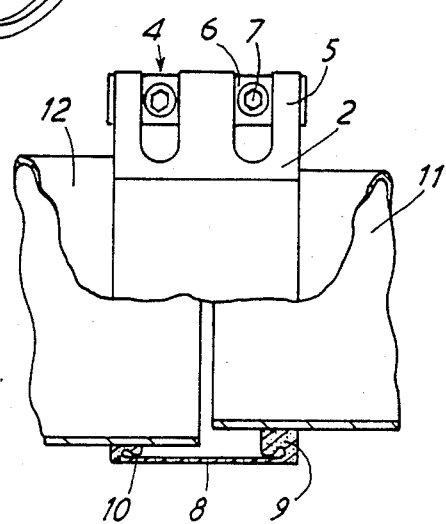
FIG. 2 shows the stepped coupling of FIG. 1 in a partly sectioned side elevation on an enlarged scale.

The stepped coupling 1 shown in the drawing has a tubular casing 2 of rolled steel, the two free ends of which can be drawn together by means of a tensioning screw device 4, leaving a longitudinal gap 3. The casing 2 is folded back on itself at its free ends and welded to form butt loops 5 along the opposing edges of the longitudinal gap 3. The tensioning screw device 4 consists of retaining pins 6 inserted through the butt loops 5 and interconnected by two tensioning screws 7 which can be tightened in the direction of the circumference of the pipes. The tensioning screws pass freely through holes in one of the pins 6 and engage screw threaded holes in the other pin 6. Alternatively the tensioning screws may pass freely through holes in the second pin and be secured by nuts. Cut-out portions 20 are provided in the butt loops to allow access to the tensioning screws for tightening.

Figure 3:
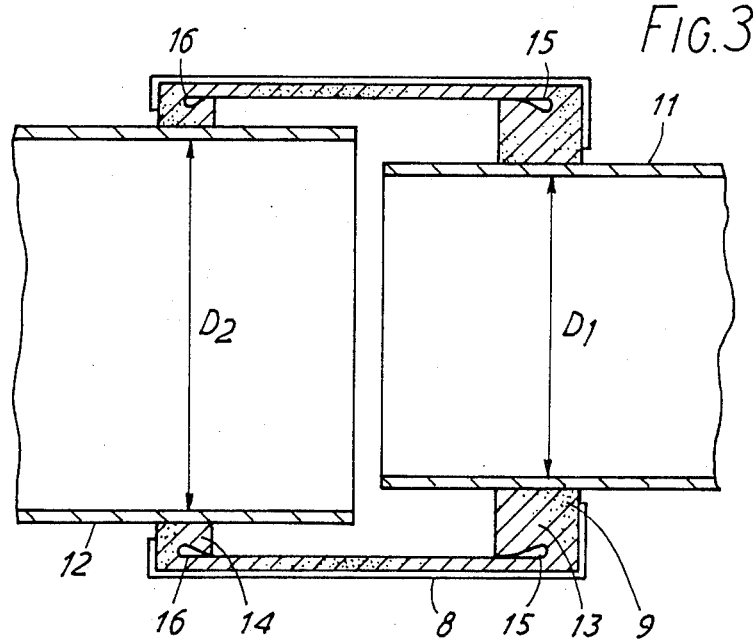
FIG. 3 shows a diagrammatic sectional view which does not include the screw connection region of the stepped coupling of FIG. 1 on a further enlarged scale.

As shown in FIG. 3, the lateral margins of the casing 2 are bent over inwardly in order to retain reliably an inserted synthetic rubber sealing sleeve 8. The sealing sleeve 8 is made in the form of a one-piece tube and has formed on both of its free ends radially inwardly extending sealing lips 9, 10. As shown in FIG. 3 of the drawing, pipes of different outside diametes, namely a pipe 11 of relatively small diameter and a pipe 12 of relatively large diameter, may be connected together coaxially by means of the stepped coupling 1. To enable this to be done, the sealing lips 9, 10 differ from each other in radial thickness by an amount which exceeds the manufacturing tolerance range for each individual pipe. The sealing lip 9 is made thicker than the sealing lip 10. The inside diameter D1 of the sealing lip 9 is substantially smaller than the internal diameter D2 of the sealing lip 10. The difference may be as much as 25 mm, 30 mm or more depending upon the diameters of the pipes that are to be interconnected by the stepped coupling.

The sealing lip 9 also has an axial width that is greater than the axial width of the sealing lip 10. In this embodiment the lip 9 is approximately twice the axial width of the lip 10.

Each of the sealing lips 9, 10 has formed on its axially inner side a freely projecting annular extension 13, 14 of trapezoidal cross-section. The annular extensions 13, 14 are formed integrally with the sealing sleeve and, in the assembled condition (FIG. 3), fit with sufficient surface pressure against the outer surfaces of the pipes 11, 12 to be connected, to form a seal. This pressure is further increased by the pressurized medium which is conveyed in the pipes 11, 12 which penetrates into the grooves 15, 16. Thus the pressure of the medium itself is utilized to increase the surface pressure of the sealing lips against the sealing surfaces on the pipes.

To assemble the coupling, the free ends of the pipes 11, 12, to be connected are introduced into the stepped coupling 1 which is then tightened by screwing up the tensioning screws 7, thereby reducing the width of the longitudinal gap 3 in the casing with a pressure-tight and reliable pipe connection is produced. Obviously care must be taken to ensure that the thicker sealing lip 9 is positioned on the smaller pipe and that the sealing lip 10 of smaller thickness is positioned on the larger pipe. Then, during the assembly operation, the resiliently flexible sealing lips 9, 10 will adapt themselves to the non-circular shape of ordinary pipe material so that an uninterrupted seating of the sealing surfaces of the lips 9, 10 is ensured. The difference of 25 mm or 30 mm in the outside diameter of the two pipes, which is assumed in the example, is compensated for by the stepped coupling 1 in a remarkably simple manner both structurally and in relation to assembly without there being any need to fear impairment of the pressure-tightness.

We claim:

1. A resiliently flexible pipe coupling for interconnecting two pipes in a pressure-tight manner, said coupling comprising:
    an adjustable tubular sheet metal casing having a longitudinal gap formed in said casing;
    a tensioning screw device secured to said casing for reducing the width of said longitudinal gap;
    a circumferentially-continuous sealing sleeve of resiliently flexible material, said sealing sleeve being positioned within said casing and comprising a tubular web portion and sealing lips of predetermined thickness integral with said web portion formed on both free ends of said sealing sleeve and extending radially inwardly from said web portion, said sealing lips being spaced apart longitudinally and having different radial thicknesses relative to each other, each sealing lip having a longitudinal width greater than its radial dimension, whereby in use tightening of said tensioning screw device clamps each said sealing lip against a respective one of said pipes.

2. A resiliently flexible pipe coupling as claimed in claim 1, wherein the radial thickness of one of said sealing lips is made larger by 4 mm than that of said other sealing lip.

3. A resiliently flexible pipe coupling as claimed in claim 1 wherein the nominal diameters of the pipes are between 50 mm and 350 mm, and wherein the inside diameter of one of said sealing lips is more than 4 mm and up to 30 mm larger than the inside diameter of said other sealing lip.

4. A resiliently flexible pipe coupling as claimed in claim 1, wherein each of said sealing lips has a base portion and an annular extension formed on the axially inner side of the base portion; and including an undercut groove radially between said annular extension and said web portion.

5. A resilient flexible pipe coupling as claimed in claim 4, wherein said annular extension has a trapezoidal cross-section.

6. A resiliently flexible pipe coupling as claimed in claim 1 wherein the radially thicker of said sealing lips has an axial width that is greater than the axial width of the other of said sealing lips.

7. A resilient flexible pipe coupling as claimed in claim 6 wherein said thicker sealing lip has an axial width that is approximately twice as great as the axial width of said other sealing lip.

8. A resilient flexible pipe coupling as claimed in claim 1 wherein said metal casing has butt loops along the edges of said longitudinal gap and wherein said tensioning screw device comprises retaining pins inserted in said butt loops and tensioning screws adjustably interconnecting said retaining pins.

9. A resilient flexible pipe coupling as claimed in claim 4 wherein each said annular extension is, in use, clamped between said web portion and its respective pipe.

10. A resilient flexible pipe coupling as claimed in claim 9 wherein the radial thickness of said extension increases towards its axial inner end.

11. A resiliently flexible pipe coupling for interconnecting to pipes in a pressure-tight manner, said coupling comprising:
- an adjustable tubular sheet metal casing having a longitudinal gap formed in said casing;
- a tensioning screw device secured to said casing for reducing the width of said longitudinal gap;
- a circumferentially-continuous sealing sleeve of resiliently flexible material, said sealing sleeve being positioned within said casing, said sleeve comprising a tubular web portion of inside diameter exceeding the outside diameter of the two pipes to form an annular clearance therebetween, said sleeeve further comprising annular sealing lips of predetermined thickness integral with said web portion and formed on both free ends of said sealing sleeve and each lip including a base portion extending radially inwardly from said web portion to engage the corresponding said pipe, said sealing lips being spaced apart longitudinally and having different radial thicknesses relative to each other, each sealing lip having a longitudinal width greater than its radial dimension, whereby in use tightening of said tensioning screw device clamps each said sealing lip against a respective one of said pipes, each sealing lip having integrally formed on the axially inner side of its said base portion a freely projecting annular extension of trapezoidal cross-section, the annular extension having a substantially radial face at the inner axial end thereof, said radial face at the inner axial end of said extension extending in the assembled condition of the device from the outer surface of the corresponding pipe radially outward to abut the radially inner face of said tubular web portion at a location spaced axially inward from the corresponding lip base portion and being pressed by said web portion with sufficient surface pressure against the outer surface of the corresponding pipe to form a seal, the radially outer surface of said extension sloping radially inward as it extends axially outward to form an annular open space radially between said tubular web portion and the radially outer face of said extension, wherein said pressure is further increased by pressurized medium conveyed in the pipes penetrating into said annular open space, such that the pressure of the medium itself is utilized to increase the surface pressure of the sealing lips against the sealing surfaces on the pipes, said extension in the assembled condition of the apparatus having its radially inner wall flat against the outer surface of the corresponding pipe and hence extending axially, the radial thickness of said extension thus decreasing from the axially inner end thereof toward the axially outer end thereof, such that the least radially thick part of said extension is that which integrally joins the axially inner face of said lip base portion, said sealing lip extending in substantially rectangular cross-section from said tubular web portion radially inward to the outer surface of the corresponding pipe, the radially inner surfaces of said extension and corresponding base portion forming a single continuous axially extending surface in contact with the sealing surface of the corresponding pipe for the full axial extent of said extension and corresponding base portion, the axial end portion of said sleeve including said base portion and said extension and the circumferentially surrounding end portion of said tubular web portion being of closed, rectangular and virtually square cross-sectional outline.

* * * * *

UNITED STATES PATENT AND TRADEMARK OFFICE
CERTIFICATE OF CORRECTION

PATENT NO. : 4,671,541

DATED : June 9, 1987

INVENTOR(S) : Ian R. WEBB et al

It is certified that error appears in the above-identified patent and that said Letters Patent is hereby corrected as shown below:

Column 5, Line 9; Change "to" to ---two---.

Signed and Sealed this

Twenty-fourth Day of November, 1987

Attest:

DONALD J. QUIGG

Attesting Officer

Commissioner of Patents and Trademarks